US010863596B2

(12) United States Patent
Weber et al.

(10) Patent No.: US 10,863,596 B2
(45) Date of Patent: *Dec. 8, 2020

(54) SYSTEMS AND METHODS FOR DAYLIGHT HARVESTING

(71) Applicant: Hubbell Incorporated, Shelton, CT (US)

(72) Inventors: Theodore E. Weber, Round Rock, TX (US); Terrence R. Arbouw, Georgetown, TX (US); Michael L. Muecke, Round Rock, TX (US)

(73) Assignee: Hubbell Incorporated, Shelton, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/799,209

(22) Filed: Feb. 24, 2020

(65) Prior Publication Data

US 2020/0196406 A1 Jun. 18, 2020

Related U.S. Application Data

(63) Continuation of application No. 16/401,847, filed on May 2, 2019, now Pat. No. 10,575,375.

(Continued)

(51) Int. Cl.
*H05B 45/00* (2020.01)
*H05B 45/10* (2020.01)
*H05B 47/11* (2020.01)

(52) U.S. Cl.
CPC ............ *H05B 45/00* (2020.01); *H05B 45/10* (2020.01); *H05B 47/11* (2020.01)

(58) Field of Classification Search
CPC ......... H05B 45/00; H05B 45/10; H05B 47/11
See application file for complete search history.

(56) References Cited

U.S. PATENT DOCUMENTS 7,045,968 B1 * 5/2006 Bierman ................. H05B 47/11
315/244
2008/0290803 A1 * 11/2008 Santo ..................... H05B 47/11
315/151

(Continued)

OTHER PUBLICATIONS

PCT/US2019/030418 International Search Report and Written Opinion dated Jul. 23 2019.

*Primary Examiner* — Raymond R Chai
(74) *Attorney, Agent, or Firm* — Michael Best & Friedrich, LLP (57) ABSTRACT

A method of determining a drive signal provided to a light-emitting diode (LED). The method includes in response to determining that a second light intensity exceeds the expected light intensity, determining, via the controller, an artificial light intensity based on a task-to-sensor ratio, determining, via the controller, a total natural light intensity based on the second light intensity and the artificial light intensity, determining, via the controller, a non-useful natural light intensity based on the total natural light intensity, the first light intensity, and the task-to-sensor ratio, determining, via the controller, the drive signal based on a desired light intensity for the zone, the total natural light intensity, the non-useful natural light intensity, and the artificial light intensity, and controlling, via the controller, the driver to provide the second drive signal to the LED array.

19 Claims, 4 Drawing Sheets

Related U.S. Application Data

(60) Provisional application No. 62/665,772, filed on May 2, 2018.

(56) References Cited

U.S. PATENT DOCUMENTS

| | | | |
|---|---|---|---|
| 2010/0244709 A1* | 9/2010 | Steiner | H05B 47/11 |
| | | | 315/158 |
| 2012/0074852 A1 | 3/2012 | Delnoij | |
| 2014/0001952 A1 | 1/2014 | Harris et al. | |
| 2014/0175985 A1 | 6/2014 | Billig et al. | |
| 2014/0232709 A1* | 8/2014 | Dunn | G09G 5/02 |
| | | | 345/207 |
| 2015/0189724 A1* | 7/2015 | Karc | G05F 1/66 |
| | | | 315/149 |
| 2017/0238387 A1 | 8/2017 | Dahlen et al. | |

\* cited by examiner

SYSTEMS AND METHODS FOR DAYLIGHT HARVESTING

RELATED APPLICATION

This application claims priority to U.S. patent application Ser. No. 16/401,847, filed May 2, 2019, which claims priority to U.S. Provisional Patent Application No. 62/665,722, filed on May 2, 2018, the entire contents of both of which are incorporated herein by reference.

FIELD

Embodiments described herein relate to controlling room lighting and other electrical loads using daylight sensors, and, more particularly, to daylight harvesting.

SUMMARY

One embodiment discloses a method of determining a drive signal provided to a light-emitting diode (LED). The method including sensing, via a first sensor, a natural light in a room, and sensing, via a second sensor, a light intensity for a zone of the room. The method further including determining, via a controller, a task-to-sensor ratio for the second sensor, and determining, via the controller, an expected light intensity based on the first light intensity and the task to sensor ratio. The method further including determining, via the controller, whether the second light intensity exceeds the expected light intensity, and in response to determining that the second light intensity exceeds the expected light intensity, determining, via the controller, an artificial light intensity based on the task-to-sensor ratio, determining, via the controller, a total natural light intensity based on the second light intensity and the artificial light intensity, determining, via the controller, a non-useful natural light intensity based on the total natural light intensity, the first light intensity, and the task-to-sensor ratio, determining, via the controller, the drive signal based on a desired light intensity for the zone, the total natural light intensity, the non-useful natural light intensity, and the artificial light intensity, and controlling, via the controller, the driver to provide the second drive signal to the LED array.

Another embodiment discloses a lighting system including a driver configured to provide a drive signal, an LED coupled to the driver and configured to receive the first drive signal and the second drive signal, a sensor positioned to sense light intensity for a zone, and an electronic controller. The electronic controller coupled to the driver and the sensor, including a memory and an electronic processor configured to receive, from the sensor, a first light intensity, retrieve from the memory a task-to-sensor ratio for the sensor; receive a non-useful light intensity, determine an artificial light intensity based on the task-to-sensor ratio, determine the drive signal based on a desired light intensity for the zone, the non-useful natural light intensity, and the artificial light intensity, and control the driver to provide the second drive signal to the LED array.

Other aspects of the application will become apparent by consideration of the detailed description and accompanying drawings.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Embodiments presented herein provide, among other things, a lighting control system for providing illumination to a zone using daylight harvesting, including compensation for non-useful daylight.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should also be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium) executable by one or more processors. As such, it should be noted that a plurality of hardware and software based devices, as well as a plurality of different structural components may be utilized to implement the invention. For example, "control units" and "controllers" described in the specification can include one or more processors, one or more memory modules including non-transitory computer-readable medium, one or more input/output interfaces, and various connections (e.g., a system bus) connecting the components.

For ease of description, each of the exemplary systems or devices presented herein is illustrated with a single exemplar of each of its component parts. Some examples may not describe or illustrate all components of the systems. Other exemplary embodiments may include more or fewer of each of the illustrated components, may combine some components, or may include additional or alternative components.

Figure 1:
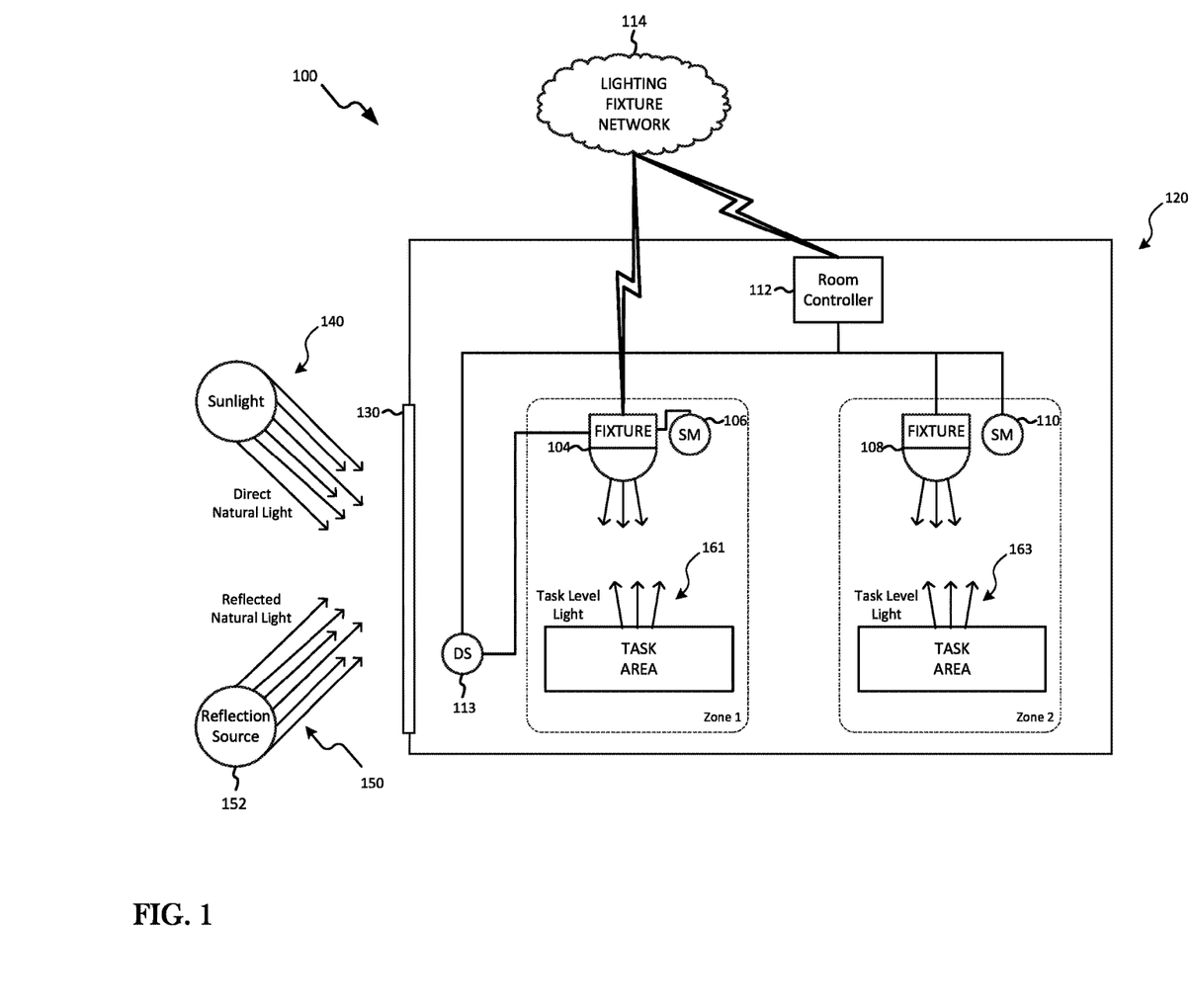
FIG. 1 schematically illustrates a lighting system, according to some embodiments.

FIG. 1 schematically illustrates an example embodiment of a lighting control system 100. The system 100 may include lighting fixtures 104, 108 (e.g., light-emitting diode (LED) lighting fixtures), sensor modules 106, 110, a room controller 112, and a daylight sensor 113. The system 100 operates to control the lighting fixtures 104, 108 and/or other electrical loads (not shown) for rooms or zones, multiple rooms or zones that are combined into areas, and multiple areas (for example, Zone 1 and Zone 2 in the room 120). In some embodiments, the lighting system 100 operates to control electrical loads across entire buildings and grounds that are separated by rooms, hallways, and/or exterior areas. In some embodiments, lighting system 100 employs an area/zone/group assignment strategy. In some embodiments, lighting fixtures 104, 106, or other devices, may be programmed to participate in only one area; however, they may belong to one or all of the available zones and groups within the area. Assignments in the areas, zones, and groups can be made through a commissioning tool (e.g., a computer program). In some embodiments, areas are used as a method of separating buildings or floors, zones to separate individual room or locations of control, and groups to configure control assignments within the rooms or locations.

In some embodiments, the lighting fixtures 104, 106, and other devices, in the system 100 are communicatively coupled to, and participate in, a lighting fixture network 114. In some embodiments, lighting fixtures (for example, the lighting fixture 104) include components that allow them to operate in a stand-alone fashion, according to local configuration data. The lighting fixture network 114 may include wired networks (for example, Ethernet, RS-485, HubbNET™, and the like), wireless networks (for example, Wi-Fi™ and Bluetooth™), and combinations of the foregoing. In some embodiments, the lighting fixture network 114 may include area controllers (for example, a Hubbell® NXAC-120 NX Area Controller) and other devices that operate according to the NX Distributed Intelligence™ lighting control platform by Hubbell®.

In some embodiments, the lighting fixture 108, the sensor module 110, the room controller 112, and the daylight sensor 113 are connected via a bus using the RS-485 serial communication standard that includes one or more conductors connecting the devices in a daisy chain or multi-drop configuration. In some embodiments, the lighting fixture 104 is communicatively coupled to the sensor module 106 and the daylight sensor 113 via a similar bus. In some embodiments, the illustrated devices connect to the busses using Hubbell® NX Smart Port™ technology. In some embodiments, the bus operates as illustrated and described in U.S. patent application Ser. No. 15/142,900 ("DEVICES, SYSTEMS, AND METHODS FOR CONTROLLING ELECTRICAL LOADS"), filed Apr. 29, 2016, the entire contents of which are hereby incorporated by reference.

The sensor modules 106, 110 include a photodiode element for sensing light levels, and one or more other sensors (for example, a passive infrared (PIR) motion sensor). In some embodiments, the sensor modules 106, 110 include one or more smart ports (for example, Hubbell® NX Smart Ports™) for coupling to and sharing sensor data with other devices in the system 100 (for example, the lighting fixture 104 and the room controller 112). In some embodiments, one or both of the sensor modules is one of the Hubbell® NXSM Series High Mount Indoor/Outdoor Sensor Modules.

The room controller 112 (for example, a Hubbell® NXRC-2RD-UNV Room Controller) operates to connect the lighting fixture 108 and the sensor module 110 to the lighting fixture network 114, to control the lighting fixture 108 (for example, based on input from the sensor module 110) locally, or a combination of both. In some embodiments, the lighting fixture 108 is also controlled by another controller (not shown) on the lighting fixture network 114. The lighting fixture 104, described more particularly below with respect to FIG. 2, includes an integral controller.

The daylight sensor 113 includes a photodiode element for sensing natural light levels (for example, in foot candles). In some embodiments, the daylight sensor 113 includes one or more smart ports (for example, Hubbell® NX Smart Ports™) for coupling to and sharing sensor data with other devices in the system 100 (for example, the lighting fixture 104 and the room controller 112). In some embodiments, the daylight sensor 113 is a Hubbell® NXDS Daylight Sensor. The daylight sensor 113 may continuously measure daylight levels and sends the information indicative of the daylight levels to the lighting fixture 104 and the room controller 112, which, as described below, control artificial light levels based on the amount of natural light in the room 120.

The fixtures 104, 108 may include dimmable light sources (for example, LEDS), which are controlled to illuminate their respective zones at a predetermined luminous intensity. In some embodiments, desired light intensity (for example, in foot candles) is determined based on tasks to be performed in the illuminated area (for example, manufacturing, general office work, warehousing goods, and the like). As illustrated in FIG. 1, the room 120 may include a window 130, through which natural light (that is, daylight) can pass. Natural light includes direct natural light 140 from the Sun, and reflected natural light 150, which is sunlight reflected from a reflection source 152. The reflection source 152 may be any reflective surface that directs sunlight into the window 130 (for example, glass or metal surfaces from a neighboring building, light colored surfaces on the ground, and the like). The sensor modules 106, 110 operate to sense task level light 161, 163. Task level light 161, 163 may be light present at the task level (that is, the height at which the tasks for which light is provided are performed). For example, task level may be the desktop surfaces of an office. Task level light 161, 163 may be formed of artificial light produced by the fixtures 104, 108 and the direct natural light 140 that comes through the window 130 to naturally illuminate the task levels in Zones 1 and 2. Embodiments of the fixture 104 and the room controller 112 implement daylight harvesting routines, which use the natural light to offset the amount of artificial light needed from the lighting fixtures to produce the desired light intensity at task level. Daylight harvesting controls artificial light levels (for example, the dimmer levels for the light fixtures) based on the desired light intensity and the natural light present at task level (for example, as sensed by the sensor modules 106, 110). As described in detail below, when reflected natural light illuminates the sensor modules 106, 110, the controllers for the light fixtures 104, 106 may misinterpret the task level light intensity and may set the artificial light dimmer levels incorrectly as a result.

Figure 2:
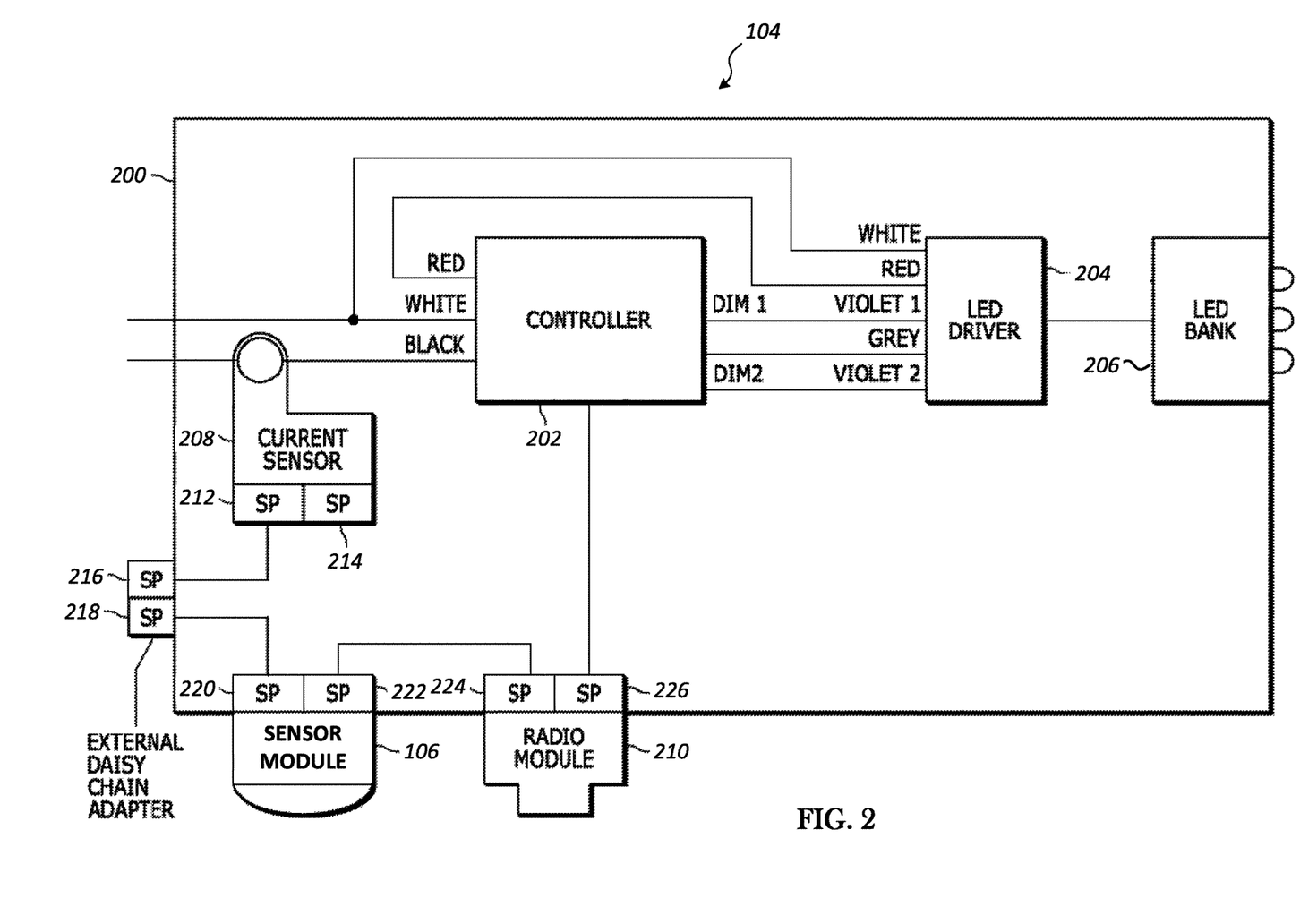
FIG. 2 schematically illustrates a lighting fixture of the system of FIG. 1, according to some embodiments.

FIG. 2 illustrates an example embodiment of the lighting fixture 104. The lighting fixture 104 includes a lighting fixture housing 200, a controller 202, an LED driver 204, and an LED bank 206. The illustrated components, along with other various modules and components are coupled to each other by, or through, one or more control or data buses that enable communication therebetween. The use of control and data buses for the interconnection between and exchange of information among the various modules and components would be apparent to a person skilled in the art in view of the description provided herein.

The controller 202 is communicatively coupled to the LED driver 204, which is coupled to and controls the LED bank 206 to produce light as specified by the controller 202. In the example illustrated, the controller 202 is communicatively coupled to the current sensor 208, the radio module 210, and the sensor module 106 via an RS-485 bus and smart ports 216-226. As illustrated, the smart ports 216, 218 allow the lighting fixture 104 to connect to other lighting fixtures, controllers, or devices external to the lighting fixture 104.

The current sensor 208, the radio module 210, and the sensor module 106 may be contained within or affixed to the housing 200. In alternative embodiments, the sensor module 106 may be external to the lighting fixture housing 200 and communicatively coupled to the controller 202 via a wired or wireless (for example, via the radio module 210) connection.

The lighting fixture 104 is optionally connected to one or more sensors, one or more switches, and one or more loads. Example sensors optionally connected to the integrated lighting fixture 104 include a temperature sensor, a current sensor, an occupancy sensor, a chemical sensor, a motion sensor, and the like. The controller 202 can also include, or be connected to a communication device, for example a wireless communication device using radio module 210, for communicating with a user. The user can receive information and send instructions or commands to the controller 202 to control the operation of the loads. The loads can be automatically controlled and adjusted by controller 202 based on a set profile, input from the switches, input from the sensors, input from a user, or combinations of the foregoing. In some embodiments, the controller 202 automatically responds to input from the user, switches, sensors, or combinations of the foregoing, and adjusts the power to the loads (e.g., to increase energy efficiency). Although the various example embodiments discussed herein use lighting units as the loads, the devices and methods described herein can be adapted for use with other electronic devices.

Figure 3:
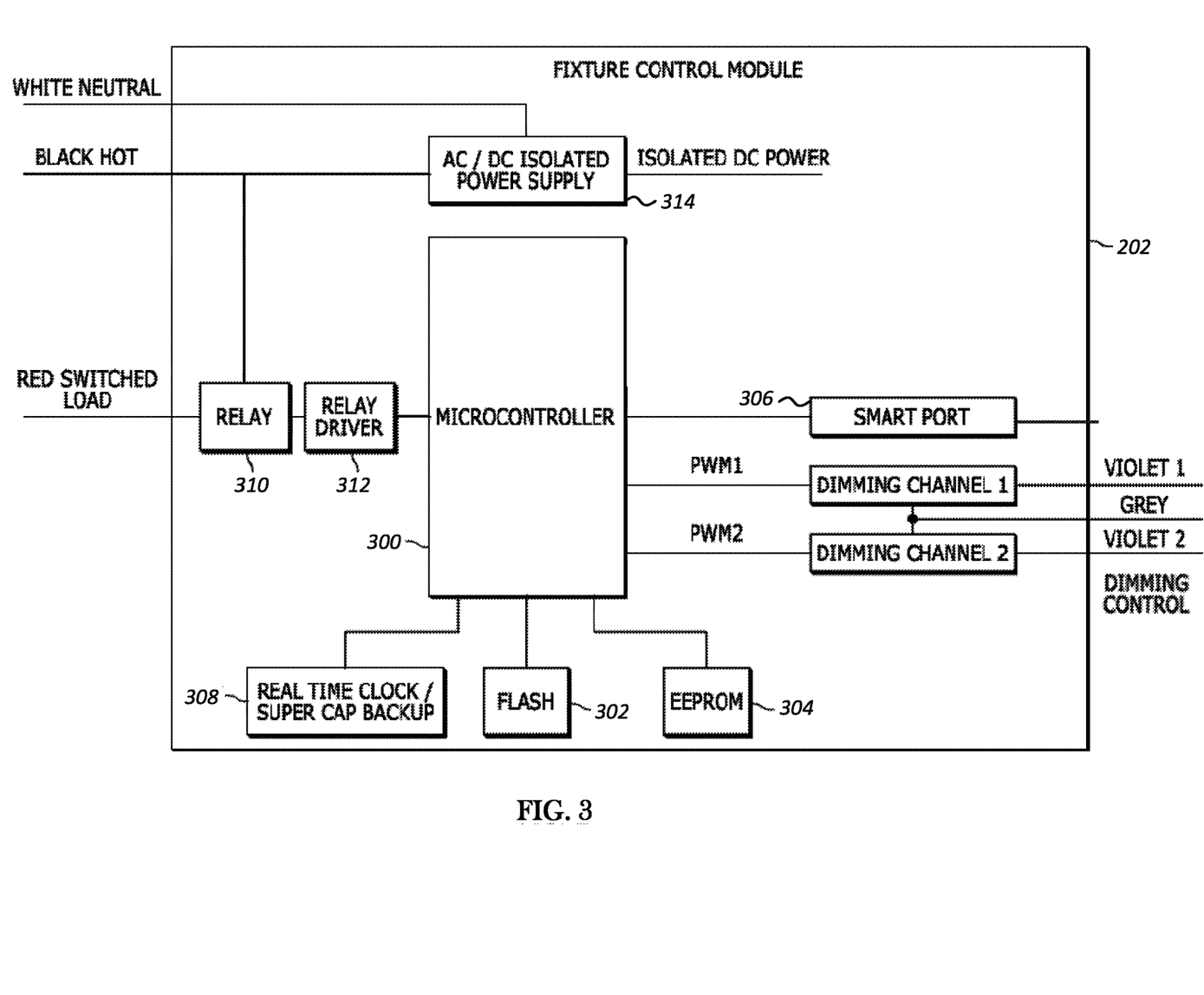
FIG. 3 schematically illustrates a controller of the lighting fixture of FIG. 2, according to some embodiments.

FIG. 3 schematically illustrates an example controller 202. Controller 202 may include a microcontroller 300, a flash memory 302, an EEPROM 304, a smart port 306 (for example, an NX Smart Port™), a relay 310, a relay driver 312, real time clock (RTC) 25, dimming channel 1, dimming channel 2, and an AC/DC isolated power supply 314. The microcontroller 300 passes data between the peripheral modules and components external to the controller 202 via the smart port 306. In some embodiments, the smart port 306 includes an RS-485 transceiver (for example, communicating to a serial port of the microcontroller 300). The microcontroller 300 also controls access to the real time clock 25. In some embodiments, the microcontroller 300 also includes an Ethernet connection, for example to an Ethernet switch (not shown). An Ethernet switch enables daisy-chaining several fixture controllers from one device to another, giving the appearance of a common multi-drop bus, although Ethernet is a point-to-point standard.

As illustrated, the controller 202 may be wired directly to a load (for example, controllable via the relay 310 and the relay driver 312). In some embodiments, the controller 202 may be configured to interact with a receptacle, either through a hard-wired connection and/or through wireless communication. In the embodiment illustrated, the fixture controller 202 provides two dimming control signals for loads over dimming channels 1 and 2, for example a 0-10V DC control signal output that can control dimmable ballasts and LED light sources. In some embodiments, dimming channel 1 is used to control the intensity (i.e., brightness) of a light source, and dimming channel 2 is used to control the chromaticity (i.e., color temperature) of the light source.

The RTC 308 keeps track of the current time and date and allows the microcontroller 300 to act as a time server for the peripheral modules so they can execute time-based functions such as schedules and active/inactive times. In some embodiments, the RTC 308 includes capacitor-based backup power, enabling it to keep accurate time for at least 72 hours after external power is removed. In some embodiments, the controller 202 is configured to independently schedule tasks utilizing its own internal real time clock 308, which may be synchronized from a Bluetooth Low Energy enabled device with the appropriate software application to access the controller 202.

In some embodiments, a computer program is provided that allows a user to the control the loads connected to the controller 202. Many types of programs can be used, including computer programs or applications for phones, tablets, smart televisions, or other devices. Various complex applications can be achieved with the controller 202 and selected by a user including daylight harvesting. Daylight harvesting can utilize the sensor module 106 and the controller 202 connected to dimmable loads. The controller 202 receives signals from the sensor module about the amount of light in a room and adjusts the dimmable loads so that the combined light output stays at a predetermined level. Light from different sources is additive so the contribution of natural light can be used in conjunction with the contribution of controlled artificial light to produce the specified lighting level in the appropriate space. Reducing the output of the artificial light reduces the energy usage of the fixture while still producing the required design light level due to the presence of natural light in the space.

Figure 4:
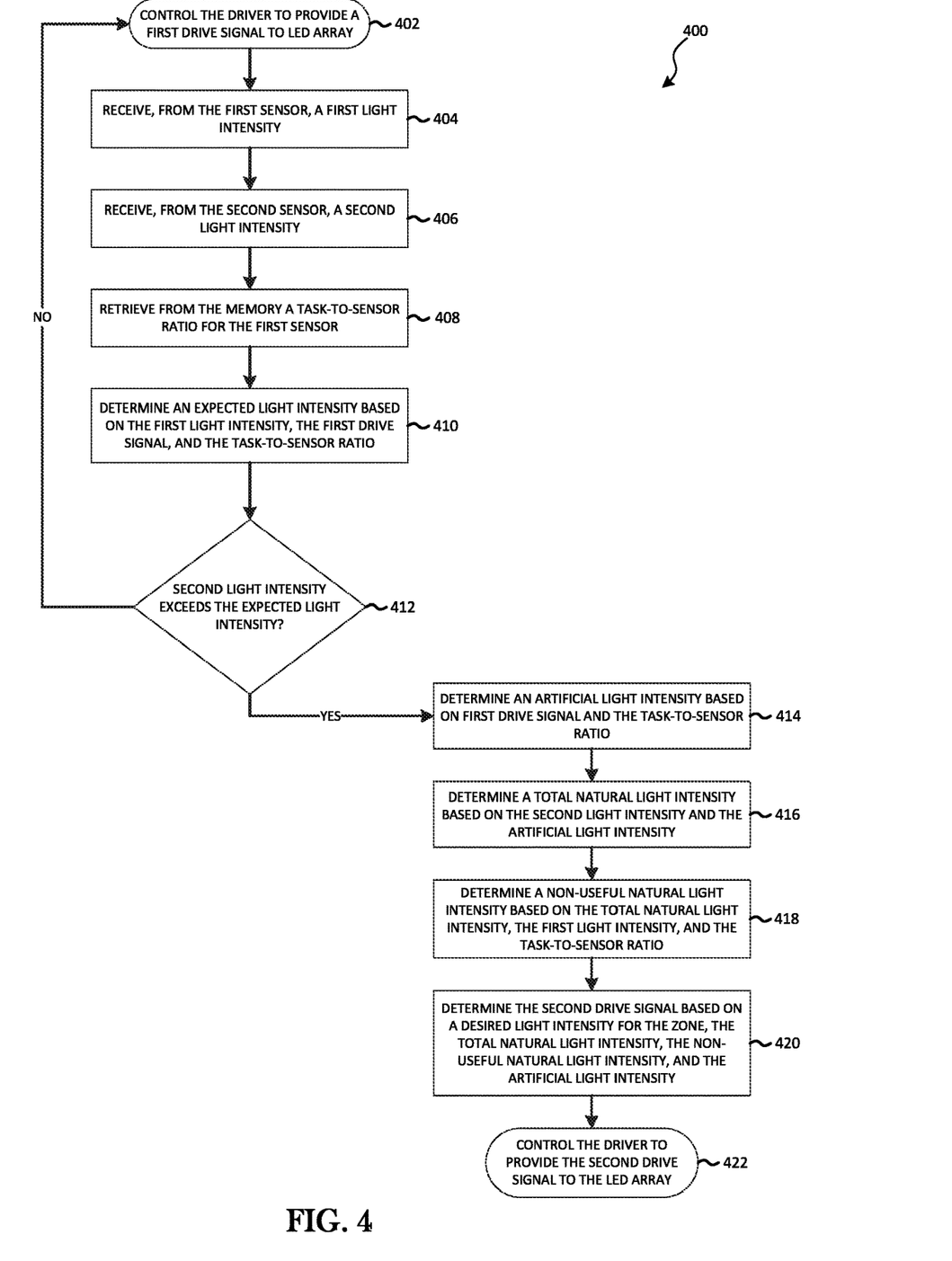
FIG. 4 is a flow chart illustrating a method for controlling the lighting system of FIG. 1, according to some embodiments.

As noted above, reflected natural light may illuminate the sensor modules 106, 110, causing the controllers for the light fixtures 104, 106 to misinterpret the task level light intensity, which interferes with the operation of daylight harvesting. Accordingly, embodiments provided herein are able to detect and compensate for reflected light. FIG. 4 illustrates an example method 400 for controlling a lighting system to compensate for non-useful daylight. The method 400 is described as being performed by the lighting fixture 104 and, in particular, the controller 202. However, it should be understood that, in some embodiments, portions of the method 400 may be performed by other devices, including for example, the room controller 112. It should also be understood that embodiments of the method 400 may be implemented by the room controller 112 and one or more light fixtures.

At block 402, the lighting fixture 104 is operating normally, controlling the driver 204 to provide a first drive signal to the LED array 206. The lighting fixture 104 operates using a daylight harvesting system, as noted above. Accordingly, the first drive signal is used to control the amount of artificial light produced by the LED array 20, which adds to the available natural light to produce the desired lighting intensity level in Zone 1. For example, the desired light intensity may be 40 foot candles, and the natural light (daylight) provides 30 foot candles in Zone 1. In such case, the first drive signal would cause the LED array to produce 10 foot candles.

The amount of natural light is determined by a first sensor (for example, the daylight sensor 113) positioned to sense daylight available at task level for Zone 1. At block 404, the controller 202 receives, from the first sensor, a first light intensity. The first light intensity is a measurement of the natural light reaching task level for Zone 1.

In order to determine whether Zone 1 (at task level) is receiving the desired light intensity, a second sensor (the sensor module 106) is positioned to sense light intensity for Zone 1. At block 406, the controller 202 receives, from the second sensor, a second light intensity. The second light intensity is a measurement of the light reflected from the task level for Zone 1. However, the objects at task level may not reflect all of the light present at task level upward to the sensor module 106. For example, 40 foot candles of light at task level may only register as 10 foot candles of light at the sensor.

Accordingly, in some embodiments, the sensor module 106 is calibrated using a task-to-sensor ratio. In the example set forth, the task-to-sensor ratio would be 4:1. Using the task-to-sensor ratio, the controller 202 can determine the light intensity at task level by measuring the light at the sensor module 106. In some embodiments, the task-to-sensor ratio is determined by comparing a light intensity reading taken at task level with one taken with the sensor module 106. At block 408, the controller 202 retrieves from a memory (for example, the flash memory 302 or the EEPROM 304) a task-to-sensor ratio for the second sensor.

It cannot be assumed that all light sensed by the second sensor is light present at and reflected from task level. For example, as illustrated in FIG. 1, direct natural light 140 may illuminate Zone 1 at task level, while reflected natural light 150 may illuminate the sensor module 106 without illuminating Zone 1 at task level. Therefore, it cannot be assumed that the second light intensity (received at block 406) accurately indicates the light at task level in Zone 1. Accordingly, at block 410, the controller 202 determines an expected light intensity for the sensor module 106. The expected light intensity is the intensity reading that should be produced at the sensor module 106 by the artificial light at task level (produced by the first drive signal driving the LED array 206) and the natural light at task level (as sensed by the first sensor). In some embodiments, the expected light intensity is based on the first light intensity (direct natural light), the first drive signal, and the task-to-sensor ratio. In one embodiment, the controller 202 adjusts the first light intensity using the task-to-sensor ratio, adjusts the intensity produced by the first drive signal using the task-to-sensor ratio, and adds the results to determine the expected light intensity.

At block 412, the controller 202 determines whether the second light intensity exceeds the expected light intensity, for example, by comparing the two values. In some embodiments, the controller 202 compares a difference between the values to a difference threshold, and determines that the second light intensity exceeds the expected light intensity when the difference exceeds the threshold. When the second light intensity fails to exceed the expected light intensity, the controller 202 continues driving the LED array using the first drive signal (at block 402).

When the second light intensity exceeds the expected light intensity (at block 412), the controller 202, at block 414, determines an artificial light intensity based on first drive signal and the task-to-sensor ratio. For example, the controller 202 may multiply the task-to-sensor ratio and a light intensity value represented by the first drive signal to determine how many foot candles the sensor module 106 should see from the light currently being produced with the LED array.

At block 416, the controller 202 determines a total natural light intensity. The total natural light intensity indicates how many foot candles of the second light intensity reading are from natural light. In some embodiments, the controller 202 determines the total natural light intensity by subtracting the artificial light intensity from the second light intensity.

As described above, some reflected natural light may reach the sensor module 106, but not be available at task level. This is non-useful natural light (or non-useful light), which may cause the controller 202 to under light the task area of Zone 1 if the controller 202 determines that more light is present at task level than is actually present. When this occurs, the controller 202 would ordinarily reduce the amount of artificial light being produced. Accordingly, at block 418, the controller 202 determines the non-useful natural light intensity. The non-useful light intensity may be based on the total natural light intensity, the first light intensity, and/or the task-to-sensor ratio. In some embodiments, the controller 202 determines the non-useful natural light intensity by multiplying the first light intensity by the task-to-sensor ratio (to determine an expected sensor reading based on the current daylight level), and subtracting the product from the total natural light intensity. The difference is the non-natural light intensity.

In other embodiments, the non-useful light intensity is a predetermined value. In such an embodiment, the non-useful light intensity may be retrieved from memory (for example, the flash memory 302 or the EEPROM 304). In such an embodiment, a look up table may be used. In yet other embodiments, the non-useful light intensity may be manually changed, for example via a user, until the measured light at task level is accurate.

In other embodiments, the non-useful light intensity is based on a linear relationship with a dim level. For example, if the dim level is set to 50%, the non-useful light intensity is approximately equal to 0.5.

In some embodiments, the non-useful light intensity may be determined by setting the LED array 206 to 100% and measuring the light level at sensor 106. The side light may then be blocked and a second light level may be measured a sensor 106. The second light level may then be subtracted from the first light level resulting in the non-useful light intensity.

Having determined the non-natural light, the controller 202 can compensate for it. At block 420, the controller 202 determines the second drive signal based on a desired light intensity for the zone, the total natural light intensity, the non-useful natural light intensity, and the artificial light intensity. In some embodiments, the controller 202 subtracts the non-useful natural light intensity from the total natural light intensity to determine a first difference. The first difference represents the natural light both available at task level and sensed by the sensor module 106. The controller 202 subtracts the first difference and the artificial light intensity from the desired light intensity for the zone to determine a second difference. The second difference represents an intensity of artificial light that must be added to or subtracted from the currently-generated light levels to produce the desired light intensity at task level. The second drive signal is determined by either adding or subtracting intensity based on the second difference.

At block 422, the controller 202 controls the driver to provide the second drive signal to the LED array. This produces the desired light intensity at task level for Zone 1. In some embodiments, after controlling the driver to provide the second drive signal to the LED array method 400 may cycle back to block 404.

In some embodiments, the lighting fixture 104 is configured to compensate for non-useful reflected light without the daylight sensor 113. In such embodiments, the useful/non-useful natural light is determined using a daylight sensor that is not communicatively coupled to the lighting fixture 104 or the room controller 112 (for example, a stand-alone light meter). In such embodiments, light intensity readings are taken at a time of day (for example, noon) that is representative of the direct and reflected natural light that will be present throughout the day. In such embodiments, the task-to-sensor ratio is determined by blocking out all of the natural light from the room 120, turning the lighting fixture 104 to full brightness, and taking two light intensity readings. The first reading is taken at task level with the light meter. The second reading is taken by the sensor module 106. The two readings are used to calculate the task-to-sensor ratio, as described above. The readings are taken again with the lighting fixture 104 turned off, to establish a linear relationship of fixture dim level to light at task level. When the natural light is unblocked, two more light readings are taken by the light meter at task level and, at the same time, the sensor module 106.

The expected light intensity at the sensor module 106 can be determined by multiplying the light intensity reading at task level (taken with the natural light unblocked) by the task-to-sensor ratio. This expected light intensity is then used to determine whether there is non-useful natural light affecting the sensor module 106. The non-useful light intensity is determined by subtracting the light intensity read by the sensor module 106 from the expected light intensity. The non-useful light intensity can be subtracted from the natural light contribution at task level when calculating the percentage of artificial light that must be applied to produce the desired light intensity at task, as noted above. The non-useful light intensity is entered into the lighting fixture 104 as a configuration value, which assumes a reasonably consistent distribution of direct and reflected natural light throughout the day.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Various features and advantages of some embodiments are set forth in the following claims.

What is claimed is:

1. A method of determining a drive signal provided to a light-emitting diode (LED), the method comprising:
   sensing, via a first sensor, a natural light in a room;
   sensing, via a second sensor, a light intensity for a zone of the room;
   determining, via a controller, a task-to-sensor ratio for the second sensor;
   determining, via the controller, an expected light intensity based on a first light intensity and the task to sensor ratio;
   determining, via the controller, whether a second light intensity exceeds the expected light intensity; and
   in response to determining that the second light intensity exceeds the expected light intensity,
      determining, via the controller, an artificial light intensity based on the task-to-sensor ratio,
      determining, via the controller, a total natural light intensity based on the second light intensity and the artificial light intensity,
      determining, via the controller, a non-useful natural light intensity based on the total natural light intensity, the first light intensity, and the task-to-sensor ratio,
      determining, via the controller, the drive signal based on a desired light intensity for the zone of the room, the total natural light intensity, the non-useful natural light intensity, and the artificial light intensity, and
      controlling, via the controller, the driver to provide a second drive signal to the LED.

2. The method of claim 1, wherein determining whether the second light intensity exceeds the expected light intensity includes comparing a difference between the second light intensity and the expected light intensity to a difference threshold.

3. The method of claim 1, wherein the task-to-sensor ratio is a ratio of an intensity of a generated artificial light for the zone of the room to a sensed light intensity for the zone of the room; the sensed light intensity having been sensed with no natural light present in the zone of the room.

4. The method of claim 1, wherein determining the artificial light intensity includes multiplying a light intensity value for the first drive signal by the task-to-sensor ratio.

5. The method of claim 1, wherein determining the total natural light intensity includes subtracting the artificial light intensity from the second light intensity.

6. The method of claim 1, wherein determining the non-useful natural light intensity includes multiplying the first light intensity by the task-to-sensor ratio, and subtracting the product from the total natural light intensity.

7. The method of claim 1, wherein determining the second drive signal includes
   subtracting the non-useful natural light intensity from the total natural light intensity to determine a first difference; and
   subtracting the first difference and the artificial light intensity from the desired light intensity for the zone of the room to determine a second difference.

8. A lighting system comprising:
   a driver configured to provide a drive signal;
   an LED coupled to the driver and configured to receive the drive signal and a second drive signal;
   a sensor positioned to sense light intensity for a zone; and
   an electronic controller, coupled to the driver and the sensor, including a memory and an electronic processor configured to
      receive, from the sensor, a first light intensity,
      retrieve from the memory a task-to-sensor ratio for the sensor,
      receive a non-useful light intensity,
      determine an artificial light intensity based on the task-to-sensor ratio,
      determine the drive signal based on a desired light intensity for the zone, the non-useful natural light intensity, and the artificial light intensity, and
      control the driver to provide the second drive signal to the LED.

9. The system of claim 8, wherein determining the artificial light intensity includes multiplying a light intensity value for the drive signal by the task-to-sensor ratio.

10. The system of claim 8, wherein the task-to-sensor ratio is a ratio of an intensity of a generated artificial light for the zone to a sensed light intensity for the zone; the sensed light intensity having been sensed with no natural light present in the zone.

11. The system of claim 10, wherein the non-useful natural light intensity is determined by subtracting a sensed light intensity for the zone, taken at a representative time by the first sensor, from an expected light intensity for the sensor;

wherein the expected light intensity is determined by multiplying a second sensed light intensity for the zone, taken at the representative time by a second sensor at task level, by the task-to-sensor ratio, and wherein the representative time is representative of the direct and reflected natural light that will be present throughout the day.

12. The system of claim 8, wherein determining the second drive signal includes subtracting the non-useful light intensity and the artificial light intensity from the desired light intensity for the zone to determine a difference.

13. The system of claim 8, wherein the non-useful light intensity is retrieved from the memory.

14. The system of claim 8, wherein the non-useful light intensity is based on the first light intensity received from the sensor.

15. The system of claim 14, wherein the non-useful light intensity is further based on an algorithm.

16. The system of claim 15, wherein the algorithm includes subtracting a value from the first light intensity.

17. The system of claim 16, wherein the value is determined based on a dim level of the LED.

18. The system of claim 16, wherein the value is a predetermined value.

19. The system of claim 8, wherein the non-useful light intensity is received from a second sensor.

* * * * *